United States Patent
Mock et al.

(10) Patent No.: US 12,363,409 B1
(45) Date of Patent: Jul. 15, 2025

(54) METHODS, SYSTEMS, AND DEVICES FOR PROVIDING UNIFORM ILLUMINATION IN THE PRESENSE OF FLOATING AIRBORNE DEBRIS

(71) Applicant: Event Capture Systems, Inc., Mint Hill, NC (US)

(72) Inventors: Brian James Mock, Mint Hill, NC (US); John Graves Larkin, Gastonia, NC (US)

(73) Assignee: Event Capture Systems, Inc., Mint Hill, NC (US)

( * ) Notice: Subject to any disclaimer, the term of this patent is extended or adjusted under 35 U.S.C. 154(b) by 471 days.

(21) Appl. No.: 17/937,939

(22) Filed: Oct. 4, 2022

Related U.S. Application Data (60) Provisional application No. 63/251,720, filed on Oct. 4, 2021.

(51) Int. Cl.
*G06T 7/00* (2017.01)
*H04N 23/52* (2023.01)
*H04N 23/56* (2023.01)

(52) U.S. Cl.
CPC ........... *H04N 23/56* (2023.01); *G06T 7/0004* (2013.01); *H04N 23/52* (2023.01)

(58) Field of Classification Search
CPC ....... H04N 23/56; H04N 23/52; G06T 7/0004
See application file for complete search history.

(56) References Cited

U.S. PATENT DOCUMENTS

2018/0186082 A1* 7/2018 Randhawa ............. B33Y 50/02
2019/0301970 A1* 10/2019 Ream .................... G01J 1/0437

OTHER PUBLICATIONS

Goldberg, Kenneth A. et al. "Testing extreme ultraviolet optics with visible-light and extreme ultraviolet interferometry." J. Vac. Sci. Technol. B. Nov./Dec. 2002. 2834-2839. vol. 20, No. 6. American Vacuum Society.

* cited by examiner

*Primary Examiner* — Antoinette T Spinks
(74) *Attorney, Agent, or Firm* — NK Patent Law (57) ABSTRACT

Disclosed herein are methods, systems, and devices for providing illumination in harsh environments having airborne floating debris. In one embodiment, an illumination device includes an enclosure having a pinhole and a light source positioned within the enclosure. The light source is configured to provide illumination external of the enclosure via the pinhole. The enclosure is configured for providing a first gas flow exiting the pinhole. The first gas flow prevents any of the airborne floating debris from entering the pinhole. In another embodiment, a method is disclosed. The method includes providing illumination via a pinhole of an enclosure comprising a light source and providing a first gas flow exiting the pinhole. The first gas flow prevents float airborne debris from entering the pinhole.

20 Claims, 8 Drawing Sheets

METHODS, SYSTEMS, AND DEVICES FOR PROVIDING UNIFORM ILLUMINATION IN THE PRESENSE OF FLOATING AIRBORNE DEBRIS

CROSS-REFERENCE TO RELATED APPLICATION

This application claims the benefit of U.S. Provisional Patent Application No. 63/251,720, filed on Oct. 4, 2021, the entire content of which is incorporated herein by reference.

TECHNICAL FIELD

The present invention is directed towards providing illumination for a camera monitoring a system. More specifically, the present invention is directed toward providing the illumination in harsh environments.

BACKGROUND

Providing uniform illumination for a camera monitoring system in a harsh environment can be a challenge. For example, a lighting source and/or a lens associated with the lighting source may become contaminated by airborne floating debris. Many manufacturing facilities have such harsh environments. Examples of manufacturing environments include a manufacturing facility that may be producing a web such as paper or cardboard. These systems typically operate under video monitoring during which video images of the environment are recorded. Specifically, the video monitoring is configured for detecting a triggering event within the environment. A triggering event may be the capturing of a defect such as a tear or puncture in the web. Upon the occurrence of the event, the video image of the event is thus recorded, or "captured" for later viewing by the system operator. Optionally, at the occurrence of the event, the manufacturing line may be shut down so that the malfunction causing the triggering event may be located and any issues associated therewith may be resolved. After the event is captured, the video image of the event may be replayed so that the event can be analyzed.

Accordingly, a need exists for methods, devices, and systems that provide uniform illumination over a desired field-of-view of a camera monitoring system within harsh environments.

SUMMARY

This Summary is provided to introduce a selection of concepts in a simplified form that are further described below in the Detailed Description of illustrative embodiments. This Summary is not intended to identify key features or essential features of the claimed subject matter, nor is it intended to be used to limit the scope of the claimed subject matter.

In one embodiment, an illumination device is disclosed for operating in a harsh environment having airborne floating debris. The illumination device includes an enclosure having a pinhole and a light source positioned within the enclosure. The light source is configured to provide illumination external of the enclosure via the pinhole. Additionally, the enclosure is configured for providing a first gas flow exiting the pinhole. The first gas flow prevents any of the airborne floating debris from entering the pinhole.

In some embodiments, the first gas flow may include instrument air. In other embodiments, the first gas flow may include an inert gas.

In some embodiments, the enclosure may be configured to maintain an internal gas pressure greater than an external air pressure.

In some embodiments, the illumination device may further include a mechanical fitting configured for receiving a second gas flow. The second gas flow may facilitate the first gas flow. Additionally, the second gas flow may provide cooling for the light source and/or the enclosure.

In some embodiments, the illumination device may further include an optical lens system positioned between the light source and the pinhole. In certain embodiments, the optical lens system may include optical zoom functionality. In further embodiments, the optical zoom functionality may be configured to be controlled remotely.

In some embodiments, the optical lens system may include a band-pass optical filter.

In some embodiments, the optical lens system may include a band-reject optical filter.

In some embodiments, the pinhole may have a diameter between 4 millimeters and 6 millimeters. In other embodiments, the pinhole has a diameter between 10 millimeters and 20 millimeters.

In some embodiments, the illumination device may further include a gimbal mounting mechanism. In certain embodiments, the gimbal mounting mechanism may be configured to be controlled remotely.

In some embodiments, the illumination device may further include driver circuitry configured to control the light source. In certain embodiments, the driver circuitry may be configured to control an intensity of the light source. In certain embodiments, the driver circuitry may be configured to control an on duration and an off duration of the light source. In further embodiments, the driver circuitry may be configured to control a frequency of the on duration of the light source. In certain embodiments, the driver circuitry may be configured to be controlled remotely.

In some embodiments, the light source may include a light emitting diode (LED) array. In certain embodiments, the LED array may be configured in a substantially circular arrangement. In further embodiments, the substantially circular arrangement may have a diameter between 50 millimeters and 80 millimeters. In other embodiments, the LED array may be configured in a substantially rectangular arrangement. In further embodiments, each side of the substantially rectangular arrangement may be between 5 millimeters and 25 millimeters. In certain embodiments, the substantially rectangular arrangement may be a substantially square arrangement. In still further embodiments, the LED array may consist of four LEDs.

In some embodiments, the light source may have a frequency band of illumination centered in a range between 820 nanometers and 880 nanometers. In other embodiments, the light source may have a frequency band of illumination centered in a range between 380 nanometers and 740 nanometers.

In some embodiments, the light source may be configured to provide a maximum lumen level between 1000 lumens and 100,000 lumens. In other embodiments, the light source may be configured to provide a maximum lumen level between 100,000 lumens and 500,000 lumens.

In some embodiments, the illumination device may be configured to provide an illuminated field of view between 150 millimeters and 160 millimeters.

In some embodiments, the illumination device may be configured to provide the illuminated field of view at a distance between three feet and five feet from the pinhole.

In some embodiments, the illumination device may further include a differential gas pressure sensor configured to detect a differential gas pressure between an internal gas pressure and an external gas pressure of the enclosure.

In another embodiment, a method is disclosed for providing illumination within a harsh environment having airborne floating debris. The method includes providing the illumination via a pinhole of an enclosure comprising a light source and providing a first gas flow exiting the pinhole. The first gas flow prevents float airborne debris from entering the pinhole.

In some embodiments, the method may further include maintaining an internal gas pressure greater than an external gas pressure of the enclosure.

In some embodiments, the method may further include providing instrument air and/or an inert gas internally to the enclosure.

In some embodiments, the method may further include providing an illuminated field of view between 150 millimeters and 160 millimeters.

In some embodiments, the method may further include providing the illuminated field of view at a distance between three feet and five feet from the pinhole.

In some embodiments, the method may further include detecting a differential gas pressure between an internal volume of the enclosure and an external location to the enclosure using a differential gas pressure sensor.

In some embodiments, the method may further include adjusting a flowrate of a second gas flow based on the differential gas pressure.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed invention is not limited to the specific methods and instrumentalities disclosed. In the drawings.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Disclosed herein are methods, devices, and systems for providing uniform illumination over a desired field-of-view of a camera monitoring system within harsh environments. The camera monitoring system may include machine vision and associated hardware to determine a level of quality for a product during manufacture and/or a level of quality associated with a manufacturing process.

A common requirement is that at least one illumination source operate in conjunction with any camera monitoring system. Proper illumination allows cameras to capture usable pixel data (i.e., clear images at low exposure with acceptable depth of field without excessive gain). Many of these machine vision solutions used for quality control are required to monitor the process in hostile environments (including high temperature, moving and sticky dust and debris between camera/light and process, vibration, water steam and vapor). The camera monitoring system's ability to deliver clear pixel data to the processing aspect of the machine vision solution depends on many parameters including maintaining a consistent level of lux output on the manufacturing process. Airborne floating debris that land on the surface of any illumination device will decrease the amount of lux available. Devices that wipe across the illumination device and/or water showers on the device may further degrade the illumination device and/or an illumination lens associated with the illumination device. An illumination device for maintaining the ability of a light source to deliver consistent lux without mechanical intervention is desired.

Figure 1:
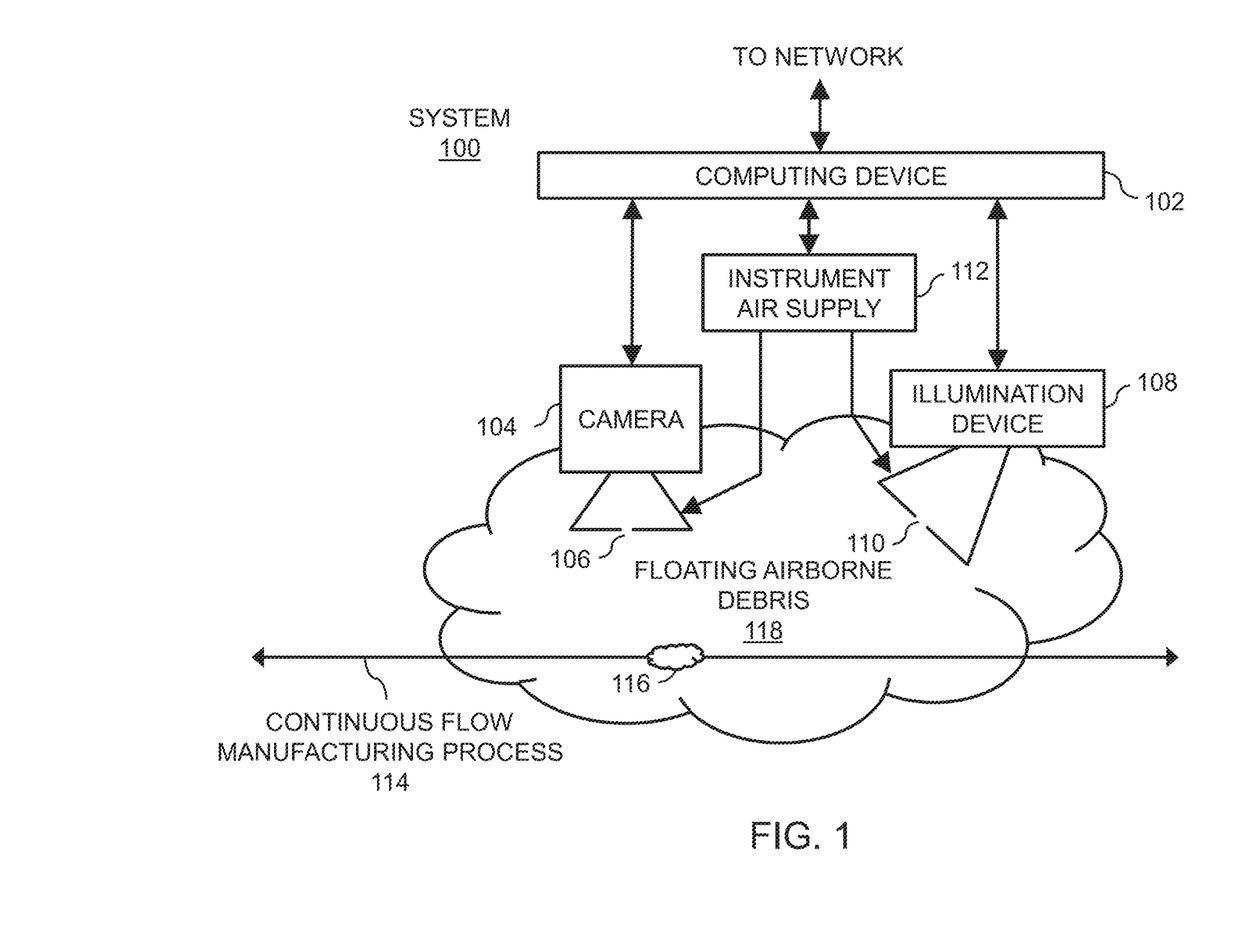
FIG. 1 depicts a block diagram illustrating a system including an illumination device and a computing device for providing a machine vision solution with a consistent lux without mechanical intervention in accordance with embodiments of the present disclosure.

FIG. 1 depicts a block diagram illustrating a system 100 for providing a machine vision solution with a consistent lux without mechanical intervention in accordance with embodiments of the present disclosure. The system 100 includes a computing device 102 communicatively coupled with a camera 104 having a first pinhole 106. The system 100 also includes an illumination device 108 having a second pinhole 110. An instrument air supply 112 provides a positive air pressure to an enclosure surrounding a lens of the camera 104 (i.e., second gas flow). Instrument air then exits via the pinhole 106 (i.e., first gas flow). The instrument air supply 112 also provides a positive air pressure to an enclosure of the illumination device 108. The instrument air then exits via the pinhole 110. The illumination device is positioned to provide illumination to a desired field of view associated with a continuous flow manufacturing process 114. The camera 104 is also positioned for capturing a plurality of images associated with the desired field of view of the continuous flow manufacturing process 114. Further, the camera 104, the illumination device 108, and the computing device 102 are configured to provide machine vision for detecting an abnormality 116 occurring with the continuous flow manufacturing process 114 and or a product associated with the continuous flow manufacturing process 114. The computing device is also communicatively coupled with a network wherein one or more of the plurality of images may be sent for further analysis by additional computing resources and/or human resources.

The instrument air exiting of the pinhole 110 protects a light source of the illumination device 108 from becoming contaminated by floating airborne debris 118 associated with the continuous flow manufacturing process 114. Likewise, the exiting air of the pinhole 106 protects a lens of the camera 104 from becoming contaminated by the floating airborne debris 118 associated with the continuous flow manufacturing process 114. In addition, the instrument air supply 112 may also be configured to protect the camera 104 and/or the illumination device 108 from overheating due to the continuous flow manufacturing process 114. The instrument air is generally an extremely clean supply of compressed air. The instrument air is free from contaminates like moisture and/or particulates. The instrument air supply 112 may include an instrument air compressor. The instrument air supply 112 may be monitored and controlled via the computing device 102.

In some embodiments, the enclosure of the illumination device 108 may include a differential air pressure sensor (not shown if FIG. 1). The differential air pressure sensor may be monitored by the computing device 102 and adjust the instrument air supply 112 to provide the correct pressure to maintain the exiting air of pinhole 110. Additionally, the camera 104 may also include a differential air pressure sensor (not shown if FIG. 1), and also operate in a similar manner. In further embodiments, a mechanical aperture and/or an automatic cap (not shown in FIG. 1) may automatically close when a differential pressure becomes too low to prevent particulates and or moisture from entering via the pinhole 110 of the enclosure of the illumination device 108. The mechanical aperture and/or automatic cap may be controlled by the computing device 102. Additionally, the camera 104 may include a mechanical aperture and/or an automatic cap (not shown in FIG. 1), and also operate in a similar manner.

In additional embodiments, the enclosure of the illumination device 108 may include a temperature sensor (not shown in FIG. 1), and the temperature sensor may be monitored by the computing device 102. Based on a detected temperature and a differential gas pressure, the computing device 102 may increase or decrease instrument air being supplied to the enclosure of the illumination device 108 to prevent overheating. To maintain both temperature and differential gas pressure, the enclosure of the illumination device 108 may include an adjustable exhaust valve (not shown if FIG. 1). The adjustable exhaust valve may also be controlled by the computing device 102 to allow additional instrument air to be provided without creating too much gas pressure within the enclosure of the illumination device 108. Additionally, the camera 104 may include a temperature sensor and/or an adjustable exhaust value (not shown in FIG. 1), and also operate in a similar manner.

In additional embodiments, the enclosure of the illumination device 108 may include a humidity sensor (not shown in FIG. 1). The humidity sensor may be monitored by the computing device 102. Based on a detected moisture level, the computing device 102 may close a mechanical aperture and/or an automatic cap (not shown in FIG. 1) to prevent additional moisture from entering the pinhole 110. The adjustable exhaust valve may then be used with additional instrument air to remove the moisture from within the enclosure of the illumination device 108. The mechanical aperture and/or the automatic cap may be re-opened automatically when the moisture level drops. Additionally, the camera 104 may include a humidity sensor (not shown in FIG. 1), and also operate in a similar manner.

In some embodiments, the system 100 may have additional cameras (each similar to camera 104) and additional illumination devices (each similar to illumination device 108) positioned to capture a much larger region of interest and/or positioned to closer to the continuous flow manufacturing process 114 and cover the same desired field of view.

In some embodiments, one or more of the components of system 100 may be integrated within the disclosed methods, devices, and/or systems of U.S. Pat. No. 9,172,916, which is herein incorporated by reference in its entirety.

In some embodiments, one or more of the components of system 100 may be integrated within the disclosed methods, devices, and/or systems of International Publication No. WO 2020/168160, which is herein incorporated by reference in its entirety.

In some embodiments, one or more of the components of system 100 may be integrated within the disclosed methods, devices, and/or systems of International Publication No. WO 2020/191259, which is herein incorporated by reference in its entirety.

In some embodiments, one or more of the components of system 100 may be integrated within the disclosed methods, devices, and/or systems of International Publication No. WO 2020/263972, which is herein incorporated by reference in its entirety.

In some embodiments, one or more of the components of system 100 may be integrated within the disclosed methods, devices, and/or systems of International Publication No. WO 2020/263984, which is herein incorporated by reference in its entirety.

Figure 2:
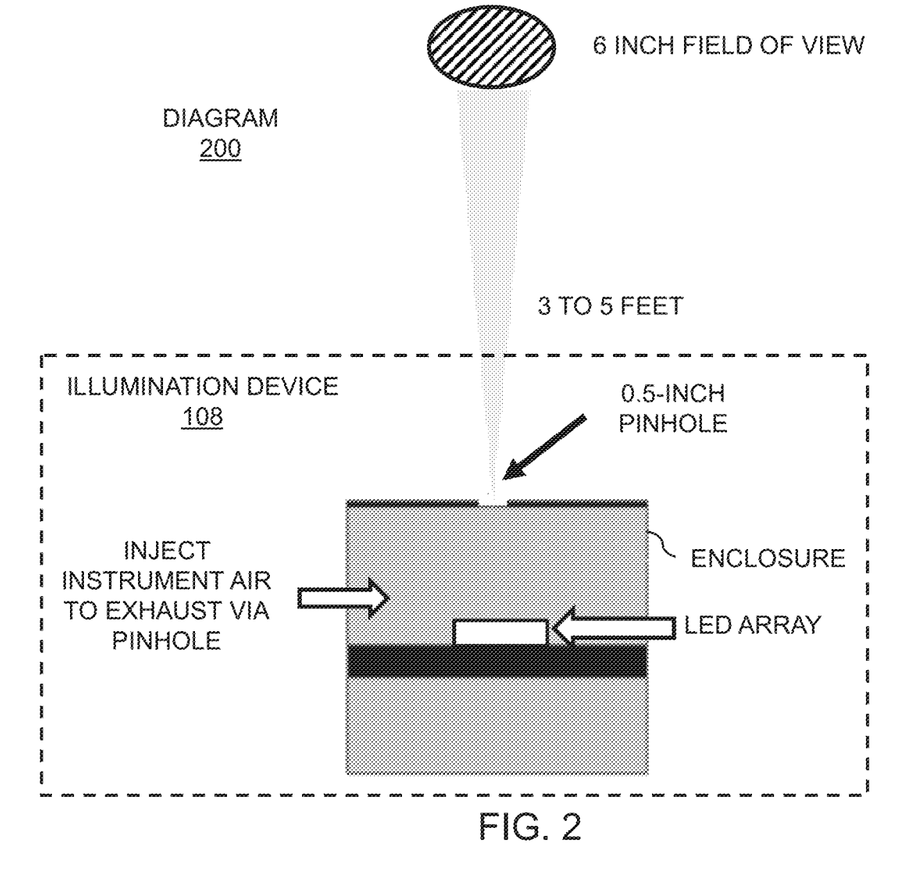
FIG. 2 depicts a diagram illustrating the illumination device of FIG. 1 having a pinhole in accordance with embodiments of the present disclosure.

FIG. 2 depicts a diagram 200 further illustrating the illumination device 108 of FIG. 1 having a pinhole in accordance with embodiments of the present disclosure. The illumination device 108 includes a light emitting diode (LED) array (i.e., light source) and a 0.5-inch pinhole. The illumination device 108 is configured to illuminate a six-inch field of view at a distance of three feet to five feet from the pinhole. The illumination device also includes a mechanical coupling arrangement to allow the injection of instrument air (i.e., second gas flow).

Figure 3:
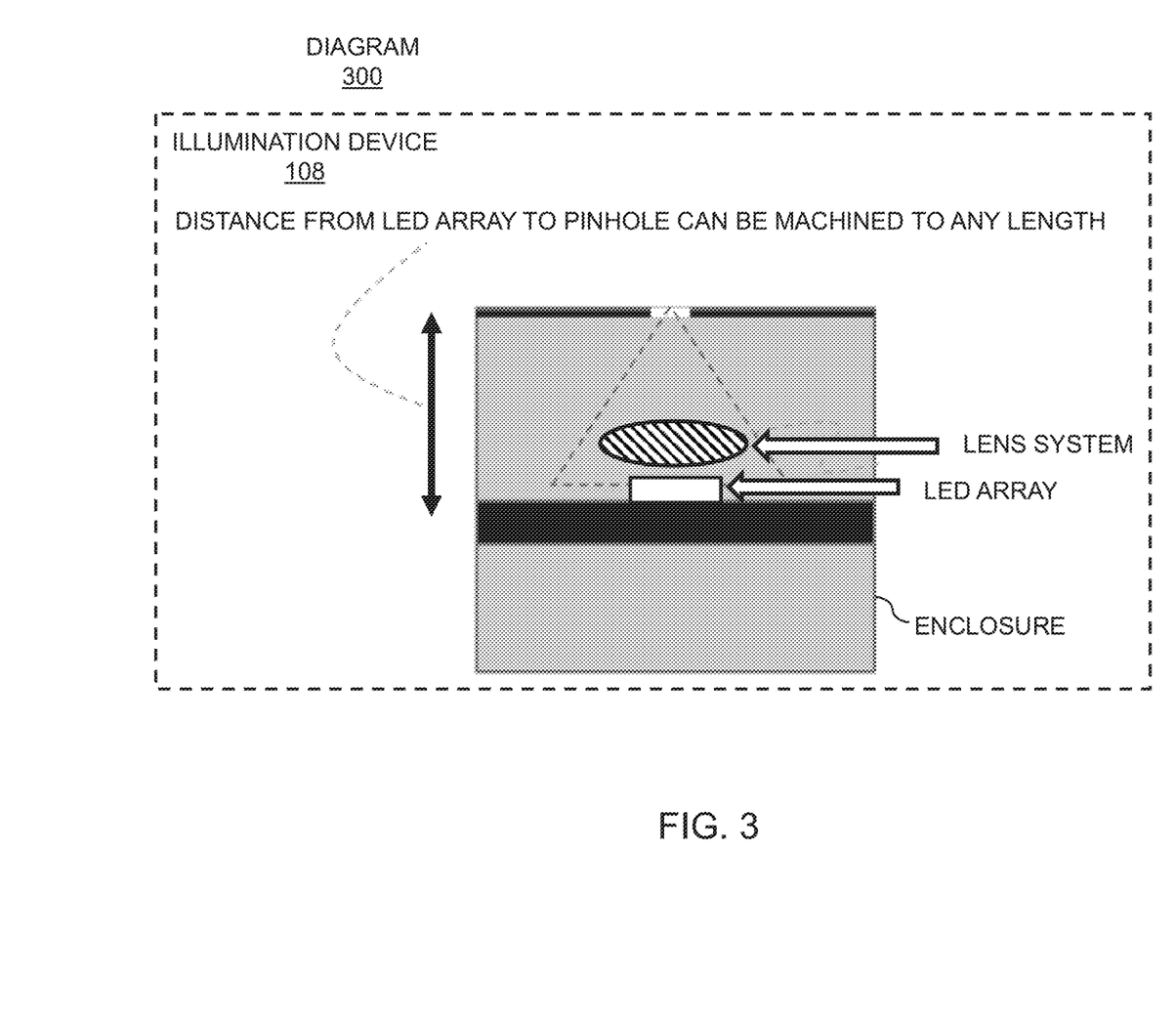
FIG. 3 depicts another diagram illustrating the illumination device of FIG. 1 in accordance with embodiments of the present disclosure.

FIG. 3 depicts a diagram 300 further illustrating the illumination device 108 of FIG. 1 and FIG. 2 in accordance with embodiments of the present disclosure. The illumination device 108 further includes a lens system in addition to the LED array and the pinhole. The lens system is configured to focus light though the pinhole to increase an efficiency of the illumination device 108. The lens system may be remotely adjustable (e.g., a zoom in and out capability) and operate as a zooming function. The computing device 102 may directly or indirectly control the zooming function.

Figure 4:
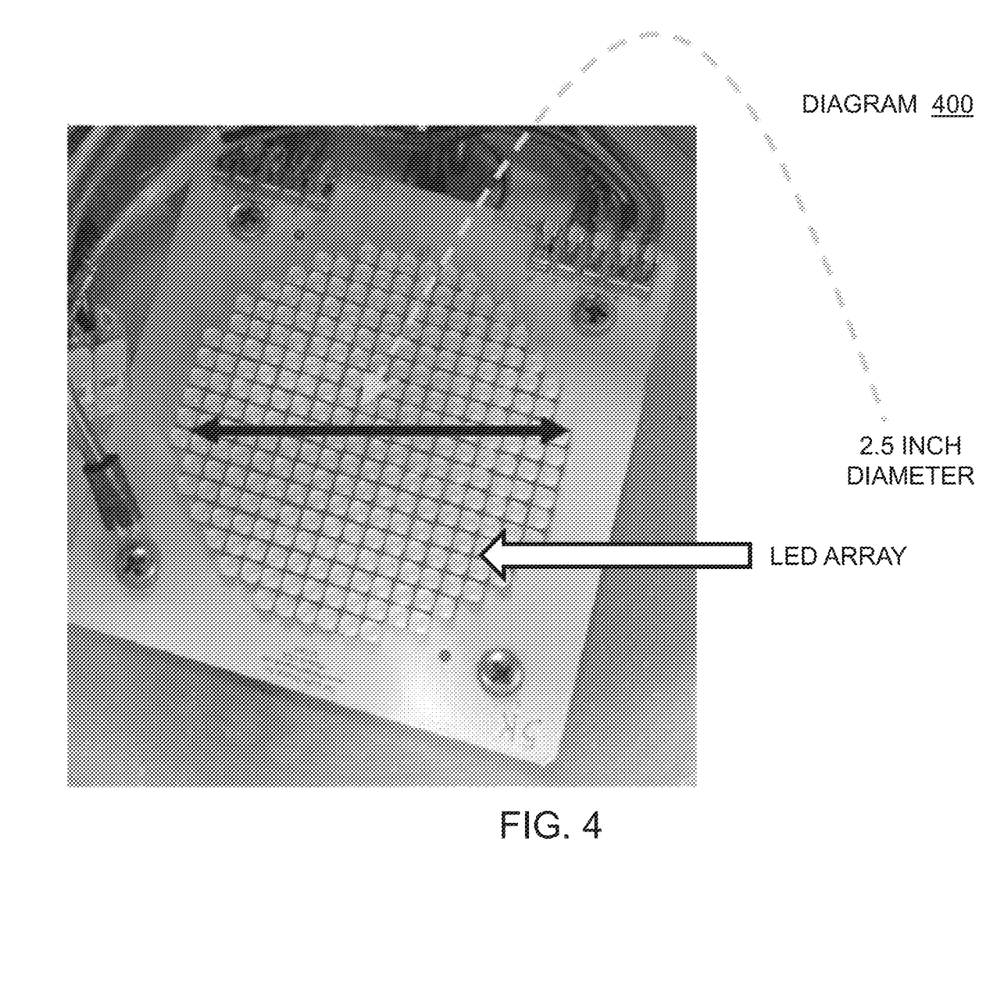
FIG. 4 depicts a diagram illustrating an LED array (i.e., a light source) in accordance with embodiments of the present disclosure.

FIG. 4 depicts a diagram 400 illustrating an LED array (e.g., the LED array of FIG. 2 and FIG. 3) in accordance with embodiments of the present disclosure. The LED array is be configured in a substantially circular arrangement. The substantially circular arrangement has a diameter of approximately 2.5 inches. In other embodiments, the diameter may be larger. In still other embodiments, the diameter may be smaller. In some embodiments, the LED array may have a frequency band of illumination centered in a range between 820 nanometers and 880 nanometers. In other embodiments, the LED array may have a frequency band of illumination centered in a range between 380 nanometers and 740 nanometers. In still other embodiments, the LED array may have a frequency band of illumination centered in a range greater than 880 nanometers. In still other embodiments, the LED array may have a frequency band of illumination centered in a range less than 380 nanometers In some embodiments, the LED array may be configured to provide a maximum lumen level between 1000 lumens and 100,000 lumens. In other embodiments, the LED array may be configured to provide a maximum lumen level between 100,000 lumens and 500,000 lumens. In still other embodiments, the LED array may be configured to provide a maximum lumen level greater than 500,000 lumens. In still other embodiments, the LED array may be configured to provide a maximum lumen level less than 1000 lumens.

The LED array may be coupled with driver circuitry (not shown in FIG. 4). The driver circuitry may be configured to control the LED array from information provided by a remote source (e.g., the computing device 102 of FIG. 1). In certain embodiments, the driver circuitry may be configured to control an intensity of the LED array. In additional embodiments, the driver circuitry may be configured to control an on duration and an off duration of the LED array. In still further embodiments, the driver circuitry may be further configured to control a frequency of the on duration of the LED array. The LED array of FIG. 4 may be configured in a manner similar to the LED array of FIG. 2 and FIG. 3.

Figure 5:
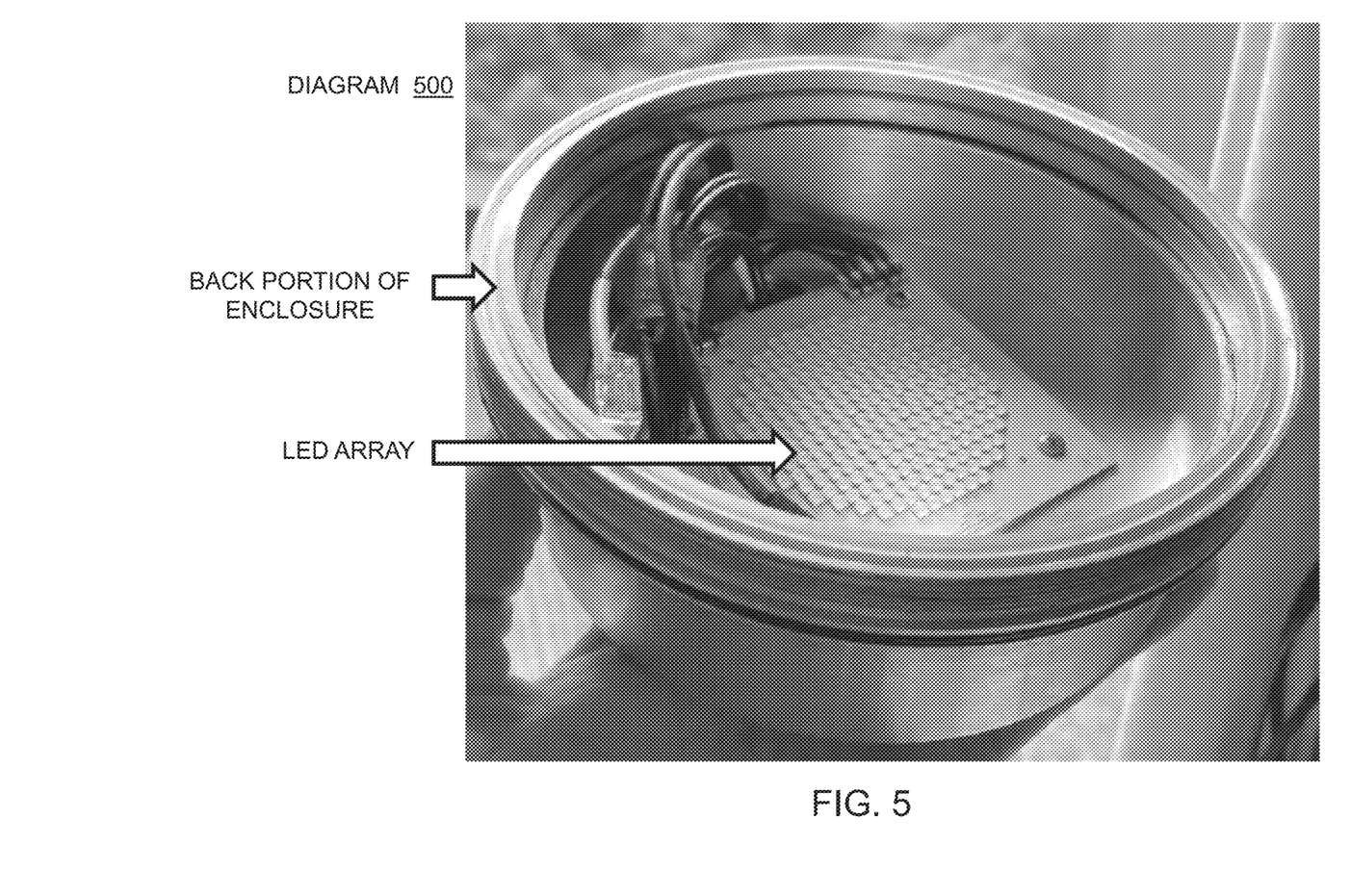
FIG. 5 depicts a diagram illustrating the LED array of FIG. 4 positioned within a portion of an enclosure in accordance with embodiments of the present disclosure.

FIG. 5 depicts a diagram 500 further illustrating the LED array of FIG. 4 positioned within a back portion of an enclosure (e.g., the enclosure of FIG. 2 and FIG. 3) in accordance with embodiments of the present disclosure. The back portion of the enclosure may be configured in a manner as needed to support the enclosure of the illumination device 108 of FIG. 1.

Figure 6:
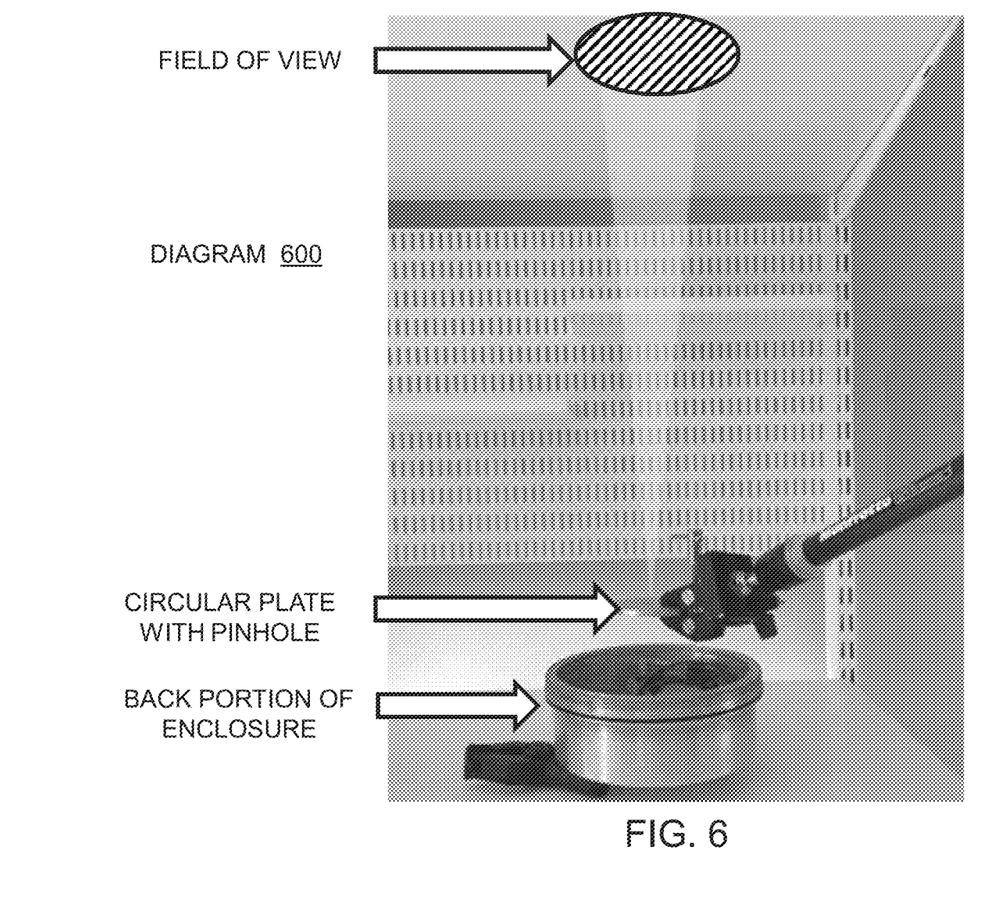
FIG. 6 depicts a diagram illustrating an illumination or a field of view on a surface using the LED array of FIG. 4 and FIG. 5 in accordance with embodiments of the present disclosure.

FIG. 6 depicts a diagram 600 illustrating an illumination or a field of view on a surface using the LED array of FIG. 4 and FIG. 5 in accordance with embodiments of the present disclosure. A mechanical arrangement holds a circular plate having a pinhole. The pinhole may be similar to the pinhole 110 of FIG. 1 and/or the pinholes of FIG. 2 and FIG. 3.

Figure 7:
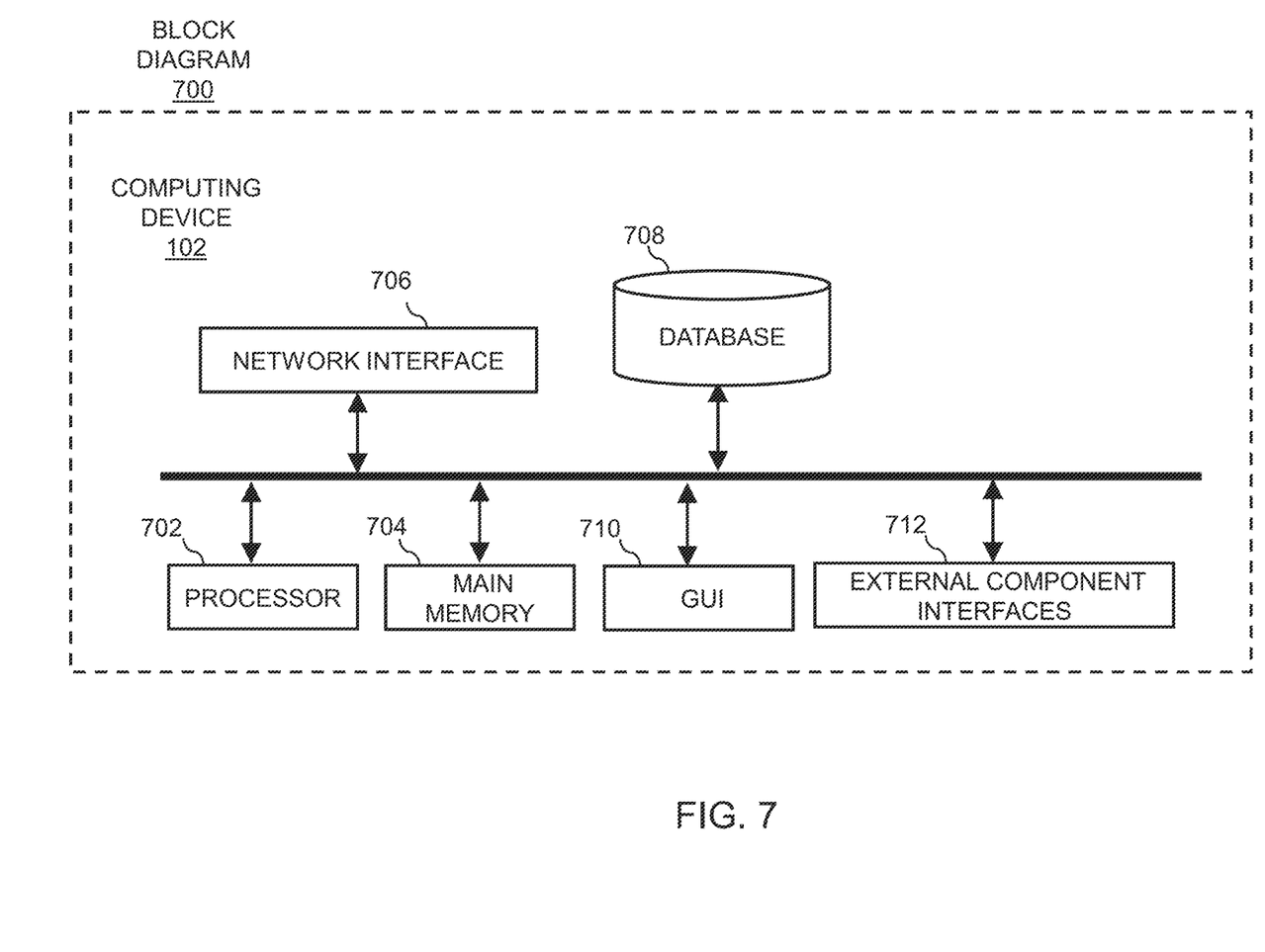
FIG. 7 depicts a block diagram illustrating the computing device of FIG. 1 in accordance with embodiments of the present disclosure in accordance with embodiments of the present disclosure.

FIG. 7 depicts a block diagram 700 illustrating the computing device 102 of FIG. 1 in accordance with embodiments of the present disclosure. The computing device 102 may include at least a processor 702, a main memory 704, a network interface 706, a database 708, a graphical user interface (GUI) 710. The GUI 710 may include a display, a keyboard, and a pointing device (e.g., mouse). The display may be an external display (e.g., a computer monitor) or an internal display (e.g., a laptop). The GUI may also include a touchpad display. The computing device 102 may include an operating system (OS) such as a Windows® OS, a Macintosh® OS, a Linux® OS, or the like. The memory 704 may include a combination of volatile memory (e.g., random access memory) and non-volatile memory (e.g., solid state drive and/or hard drives). The network interface 706 may be a wired Ethernet interface or a Wi-Fi interface configured to connect to the network described in FIG. 1. The computing device 102 also includes external component interfaces 712 for monitoring and controlling the camera 104, the illumination device 108 and the instrument air supply 112 of FIG. 1. The external component interfaces 712 may include one or more GigE Vision interfaces, one or more 10 GigE Vision interfaces, one or more Camera Link interfaces, one or more USB3 Vision interfaces, one or more M12 Ethernet interfaces, and/or the like.

Figure 8:
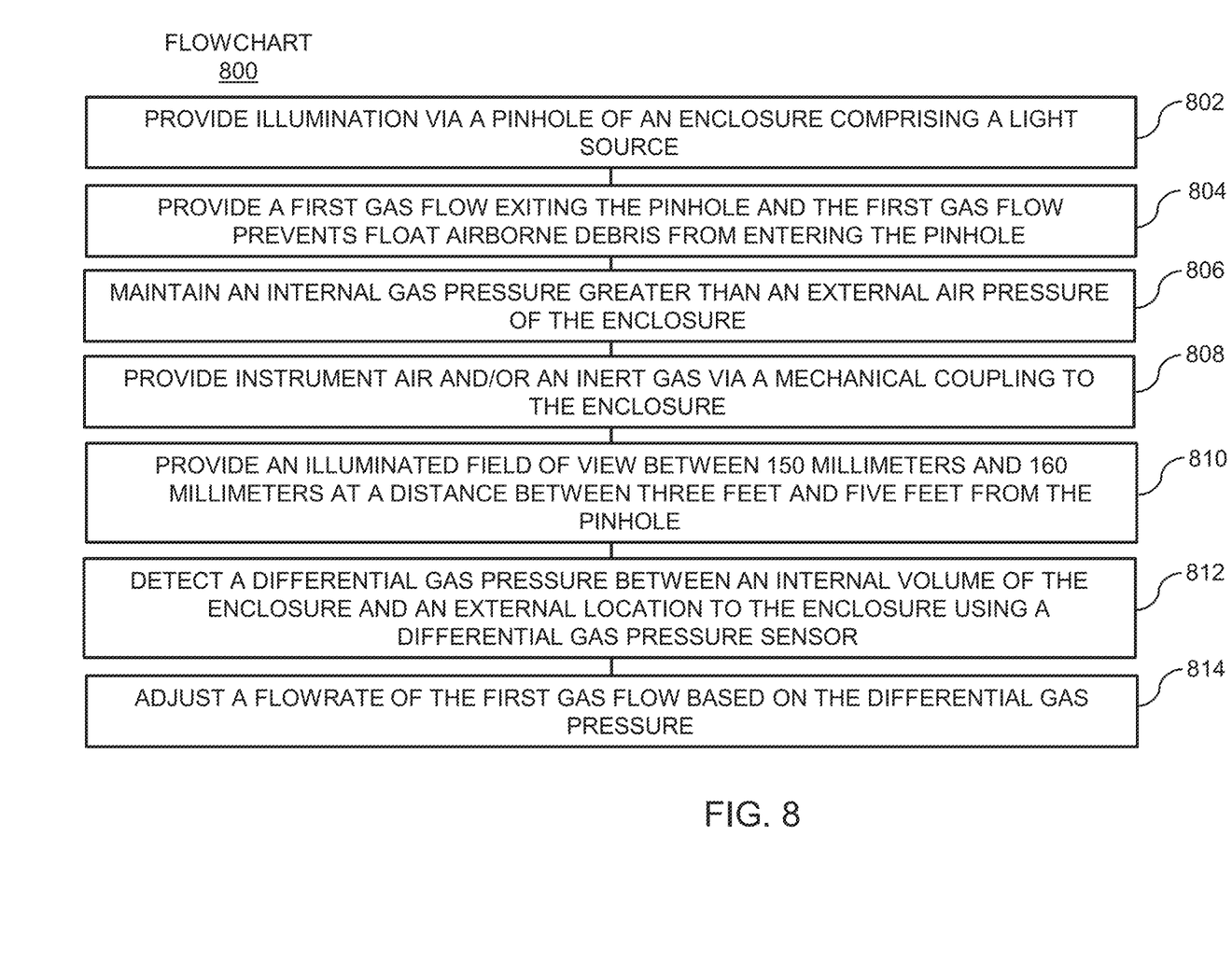
FIG. 8 depicts a flowchart illustrating a method of illumination using the system of FIG. 1 in accordance with embodiments of the present disclosure.

FIG. 8 depicts a flowchart 800 illustrating a method of illumination (e.g., using the system 100 of FIG. 1) in accordance with embodiments of the present disclosure. In step 802, the method includes providing illumination via a pinhole of an enclosure comprising a light source. The light source may be the LED array of FIG. 4.

In step 804 the method further includes providing a first gas flow exiting the pinhole and the first gas flow prevents float airborne debris from entering the pinhole.

In step 806 the method further includes maintaining an internal gas pressure greater than an external air pressure of the enclosure.

In step 808 the method further includes providing instrument air and or an inert gas via a mechanical coupling to the enclosure.

In step 810 the method further includes providing an illuminated field of view between 150 millimeters and 160 millimeters at a distance between three feet and five feet from the pinhole.

In step 812 the method further includes detecting a differential gas pressure between an internal volume of the enclosure and an external location to the enclosure using a differential gas pressure sensor.

In step 814 the method further includes adjusting a flowrate of the first gas flow based on the differential gas pressure.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby, JavaScript, Java, Python, Ruby, PHP, C, C++, C#, Objective-C, Go, Scala, Swift, Kotlin, OCaml, or the like. The program code may execute entirely on the user's computer, partly on the user's computer, as a stand-alone software package, partly on the user's computer, and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions/acts specified in the flowchart and/or block diagram block or blocks. It will also be understood that each block of the flowchart illustrations and/or block diagrams, and combinations of blocks in the flowchart illustrations and/or block diagrams, may include computations and logic blocks being implemented in programmable logic devices such as a field programmable gate array (FPGA) or a complex programmable logic device (CPLD). Similarly, the computations and logic blocks may be implemented in an application specific integrated circuit (ASIC) and use a combination of embedded processors and logic gates to implement the algorithms.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. An illumination device comprising:
   an enclosure having a pinhole; and
   a light source positioned within the enclosure, wherein:
      the light source is configured to provide illumination external of the enclosure via the pinhole; and
      the enclosure is configured for providing a first gas flow exiting the pinhole, wherein the first gas flow prevents floating airborne debris from entering the pinhole.

2. The illumination device of claim 1, wherein the first gas flow comprises at least one of instrument air and an inert gas.

3. The illumination device of claim 1, wherein the enclosure is configured to maintain an internal gas pressure greater than an external air pressure.

4. The illumination device of claim 1 further comprising a mechanical fitting configured for receiving a second gas flow.

5. The illumination device of claim 1 further comprising an optical lens system positioned between the light source and the pinhole.

6. The illumination device of claim 5, wherein the optical lens system comprising optical zoom functionality and the optical zoom functionality is configured to be controlled remotely.

7. The illumination device of claim 5, wherein the optical lens system comprises at least one of a band-pass optical filter and a band-reject optical filter.

8. The illumination device of claim 1, further comprising a gimbal mounting mechanism and the gimbal mounting mechanism is configured to be controlled remotely.

9. The illumination device of claim 1 further comprising driver circuitry configured to control the light source and the driver circuitry is configured to be controlled remotely.

10. The illumination device of claim 9, wherein the driver circuitry is configured to control an intensity of the light source.

11. The illumination device of claim 9, wherein the driver circuitry is configured to control an on duration and an off duration of the light source.

12. The illumination device of claim 11, wherein the driver circuitry is configured to control a frequency of the on duration of the light source.

13. The illumination device of claim 1, wherein the light source comprises a light emitting diode (LED) array.

14. The illumination device of claim 13, wherein the LED array is configured in a substantially circular arrangement.

15. The illumination device of claim 14, wherein the substantially circular arrangement has a diameter between 50 millimeters and 80 millimeters.

16. The illumination device of claim 1, wherein the light source has a frequency band of illumination centered in at least one of a first range between 820 nanometers and 880 nanometers and a second range between 380 nanometers and 740 nanometers.

17. The illumination device of claim 1, wherein the illumination device is configured to provide an illuminated field of view between 150 millimeters and 160 millimeters and at a distance between three feet and five feet from the pinhole.

18. The illumination device of claim 1 further comprising a differential gas pressure sensor configured to detect a differential gas pressure between an internal gas pressure and an external gas pressure of the enclosure.

19. A method of illuminating, the method comprising:
   providing illumination via a pinhole of an enclosure comprising a light source; and
   providing a first gas flow exiting the pinhole, wherein the first gas flow prevents float airborne debris from entering the pinhole.

20. The method of claim 19 further comprising:
   detecting a differential gas pressure between an internal volume of the enclosure and an external location to the enclosure using a differential gas pressure sensor; and
   adjusting a flowrate of a second gas flow based on the differential gas pressure.

* * * * *